No. 754,883. PATENTED MAR. 15, 1904.
G. MORTON.
APPARATUS FOR THE MANUFACTURE OF TUFTED FABRICS.
APPLICATION FILED JUNE 6, 1902.
NO MODEL. 10 SHEETS—SHEET 1.

FIG. 1.

No. 754,883. PATENTED MAR. 15, 1904.
G. MORTON.
APPARATUS FOR THE MANUFACTURE OF TUFTED FABRICS.
APPLICATION FILED JUNE 6, 1902.
NO MODEL. 10 SHEETS—SHEET 5.

FIG. 5.

No. 754,883. PATENTED MAR. 15, 1904.
G. MORTON.
APPARATUS FOR THE MANUFACTURE OF TUFTED FABRICS.
APPLICATION FILED JUNE 6, 1902.
NO MODEL. 10 SHEETS—SHEET 6.

FIG. 6.

No. 754,883. PATENTED MAR. 15, 1904.
G. MORTON.
APPARATUS FOR THE MANUFACTURE OF TUFTED FABRICS.
APPLICATION FILED JUNE 6, 1902.
NO MODEL. 10 SHEETS—SHEET 8.

No. 754,883. Patented March 15, 1904.

UNITED STATES PATENT OFFICE.

GAVIN MORTON, OF DARVEL, SCOTLAND, ASSIGNOR OF ONE-HALF TO WALLACE FAIRWEATHER, OF GLASGOW, SCOTLAND.

APPARATUS FOR THE MANUFACTURE OF TUFTED FABRICS.

SPECIFICATION forming part of Letters Patent No. 754,883, dated March 15, 1904.

Application filed June 6, 1902. Serial No. 110,472. (No model.)

*To all whom it may concern:*

Be it known that I, GAVIN MORTON, a subject of the King of the United Kingdom of Great Britain and Ireland, residing at Invergower, Darvel, Ayrshire, Scotland, have invented certain new and useful Apparatus for the Manufacture of Tufted Fabrics, (for which application for patent has been made in Great Britain, No. 23,091, dated November 15, 1901,) of which the following is a specification.

This invention has for its object the more rapid, regular, and economical production by machinery of tufted fabrics—such as Donegal or Turkey carpets—hitherto commonly made by tying, looping, or knotting by hand short lengths or tufts of yarn around warps stretched on a framing and passing weft shots through sheds formed by the warps to weave a backing and to retain in place the rows of knotted tufts, which may be party-colored to form the pattern or design.

To that end the invention consists of a loom or machine organized and arranged to produce tufted fabrics, such as carpets, of any desired width and in which the several operations of selecting the yarn for the tufts, cutting off tuft lengths and knotting them onto the warp, shedding the latter, and putting in the wefts are effected mechanically by devices specially constructed and arranged to come into action in proper relation and at suitable intervals of time.

In the accompanying drawings, which illustrate the invention, Fig. 7 is a sectional elevation, to a larger scale, of the upper part of Fig. 5, showing the warp-carriers and devices which operate them, as also one of the tufting segments or selectors which carry the several colored threads used for forming the tufts which are knotted into the warps. Fig. 7ª shows a detail hereinafter referred to.

Figures 7, 7A:
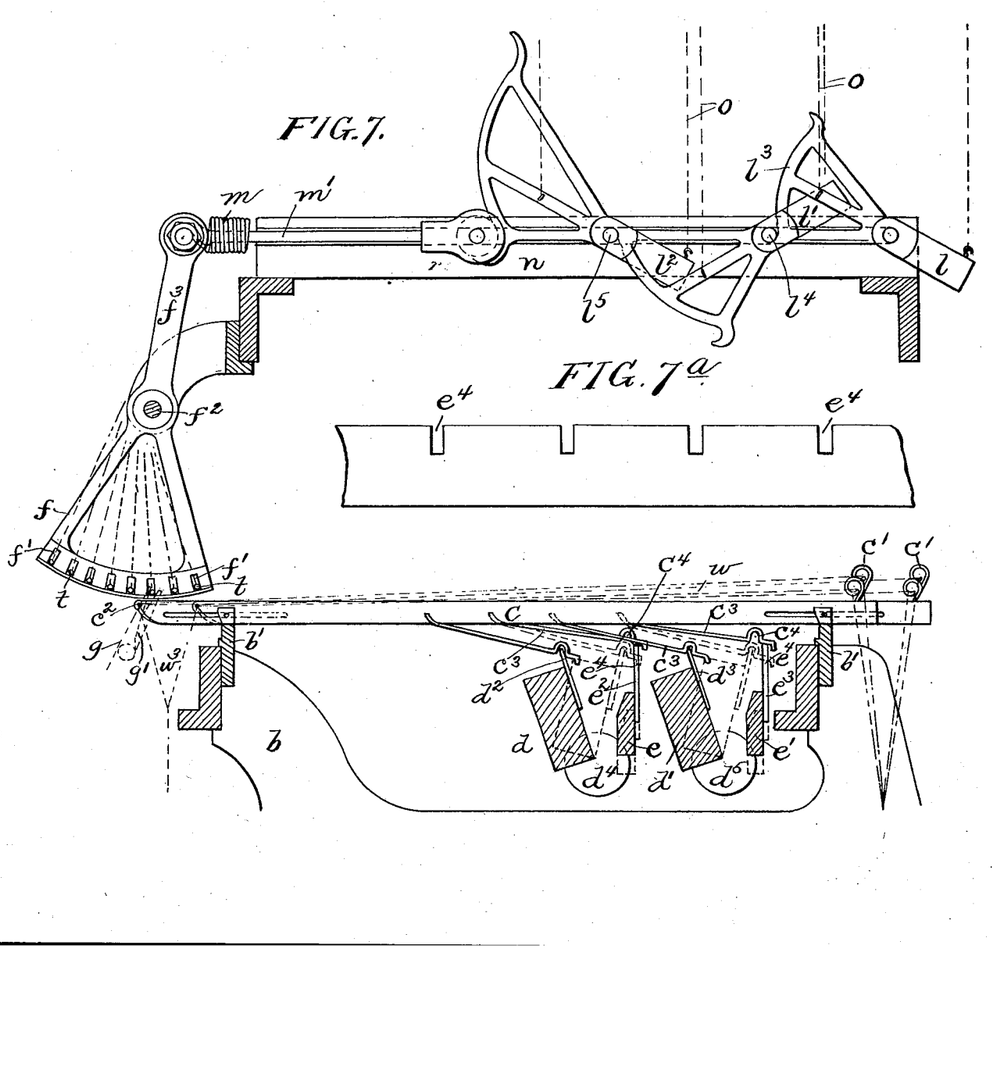

As shown by the drawings, the machine comprises suitably-braced end standards or frames $a$ $a'$ for carrying the driving and other shafts and operating parts. Between two of these end standards is mounted a framing $b$, Fig. 7, of approximately rectangular form in plan, having longitudinal rails $b'$ with numerous divisions or cross-grooves in which lie horizontally on edge a series of thin parallel bars or slides $c$, each carrying one of the warp-threads $w$, which extend from a warp-beam $w'$ to guide-eyes $c'$ on the rear ends of the individual warp-carrying bars $c$, along which the warp-threads are carried singly to eyes or orifices $c^2$ on their front ends and thence to the cloth-beam $w^2$. These warp-carrying bars $c$, of which there is one for each of the warps in the breadth of the fabric, have endwise movements imparted to them by mechanism hereinafter referred to, by means of which they are in the first instance moved forward in successive pairs at suitable intervals apart in order that the tufts of yarn may be tied or knotted on pairs of the warps, as indicated at Fig. 7, and thereafter each alternate bar $c$ is moved forward, while the others are moved rearwardly to the positions indicated in order to form a shed $w^3$, through which the weft shot is passed. These movements of the warp-carriers may be effected in various ways; but, as herein described, the warp-carrying bars $c$ are treated as "odds" and "evens" alternately.

Figure 8:
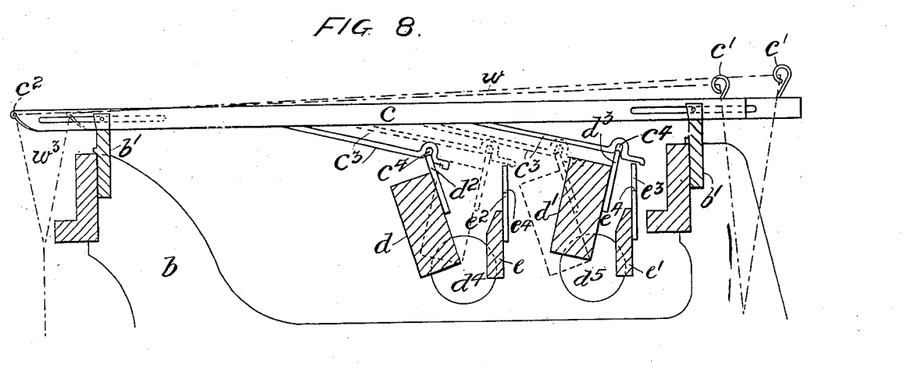
Figs. 8 and 9 are sectional elevations corresponding to the lower part of Fig. 7, showing the warp-carriers as moved into the different positions they occupy in shedding the warp.
Figure 9:
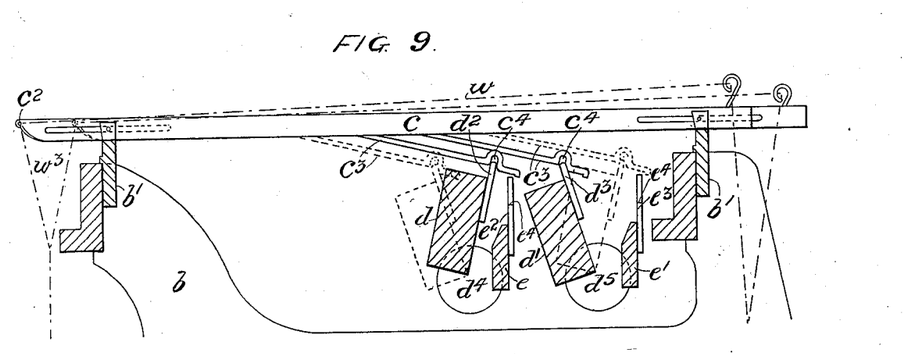

Each of the bars $c$ has attached to it by soldering or otherwise a rearwardly-extending spring-wire $c^3$, having formed near its free end a notch part $c^4$. With these notches $c^4$ are fitted to engage catch-plates $d^2$ $d^3$ upon rocking bars $d\,d'$, which are each carried upon pivot-centers $d^4$ $d^5$, so as to rock from the positions shown by full lines to those shown by dotted lines in Figs. 7, 8, and 9, one catch-plate, $d^2$, engaging the even bars or warp-carriers $c$ and the other catch-plate, $d^3$, engaging the odd bars or warp-carriers $c$ of the series across the breadth of the loom. In such position of the catch-bars the one half of the number of warp-carriers $c$—e. g., the evens—are in their extreme forward position, and the other half, forming the odd warp-carriers, are in their extreme rearward position, so that the warps passing through the eyes $c^2$ at their forward ends form the shed $w^3$, through which the weft-shot is passed, as hereinafter described.

The spring-wires $c^3$ normally rest upon the upper edges of plates $e^2$ $e^3$, carried by vertically-movable bars $e\,e'$, which bars are lowered out of contact with the spring-wires $c^3$ when the shedding operation takes place; but at other times—i. e., while the tufting operation proceeds—the bars $e\,e'$ are raised into the position shown at Fig. 7 and then the notches $c^4$ of the spring-wires $c^3$ are out of engagement with the catch-plates $d^2$ $d^3$, excepting a pair at each interval, one of which drops into a notch $e^4$ under it in each of the plates $e^2$ $e^3$. Fig. 7$^a$ shows one of the plates $e^2$ or $e^3$ having cut in it at intervals the notches $e^4$, into which the spring-wires $c^3$ drop to be acted on by the catch-plates $d^2$ $d^3$. The bars $e\,e'$ have no endwise movement; but the framing $b$, on which the warp-carriers $c$ are fitted, has intermittent endwise movement imparted to it to such an extent as to bring a fresh warp-carrier $c$ over each notch $e^4$ in each bar $e^2$ $e^3$ at each of its intermittent movements, so that the spring-wires $c^3$ of a fresh pair of warp-carriers $c$ are allowed to drop into engagement with the catch-bars $d^2$ $d^3$, each pair of adjacent warp-carriers being made up of an odd and an even. The intermittent movement of the frame $b$ in one direction continues until each of the warp-carriers $c$ has dropped into a notch to be acted on by the catch-bar $d^2$ or $d^3$, the total extent of endwise movement being equal to the space between the notches $e^4$ in the bar $e^2$ or $e^3$, Fig. 7$^a$.

A pair of warp-carriers $c$ at intervals apart equal to the distance apart of the notches $e^4$ in the bars $e^2$ or $e^3$ is thus brought forward into the position shown at Fig. 7 and remains there until a tuft of yarn led to a point just over the eyes $c^2$ is by means of devices hereinafter described drawn off on one side and cut or shorn off on the other side of the pair of warp-carriers $c$, drawn over the noses thereof or merely over the warps, and finally tied around the pair of warps $w$, carried thereby, so as to form a knotted tuft at each interval along the breadth of the loom, and as each pair of warp-carriers and warps is brought in succession into position and has a tuft of yarn tied thereon a series of tufts is tied to the warp across the whole width of the loom by the time the intermittently-moving frame $b$ has traversed the space between two of the notches $e^4$, Fig. 7$^a$. On completion of such intermittent endwise movement in one direction, which is effected by a cam, as hereinafter mentioned, the framing $b$ is traversed in the opposite direction by a separate cam to its original position, from which the intermittent movements begin de novo. Just before or while the framing $b$ is traversed to its first position the bars $e\,e'$ descend and allow the wires $c^3$ of the odd and even warp-carriers $c$ to engage with the catch-plates $d^2$ or $d^3$, which are then rocked to move forward the odds and to move rearward the evens of the warp-carriers $c$, whereby the warps are shed, as indicated at $w^3$, and a weft shot is passed through the open warps. This shedding action is effected, preferably, twice and two weft shots thrown before the framing $b$ returns to its original position, or at least before its intermittent endwise movement again begins, so that the weft is fully shot and beat up before the tufting operation again proceeds.

Figures 16, 17, 18, 19, 20, 21, 22, 23:
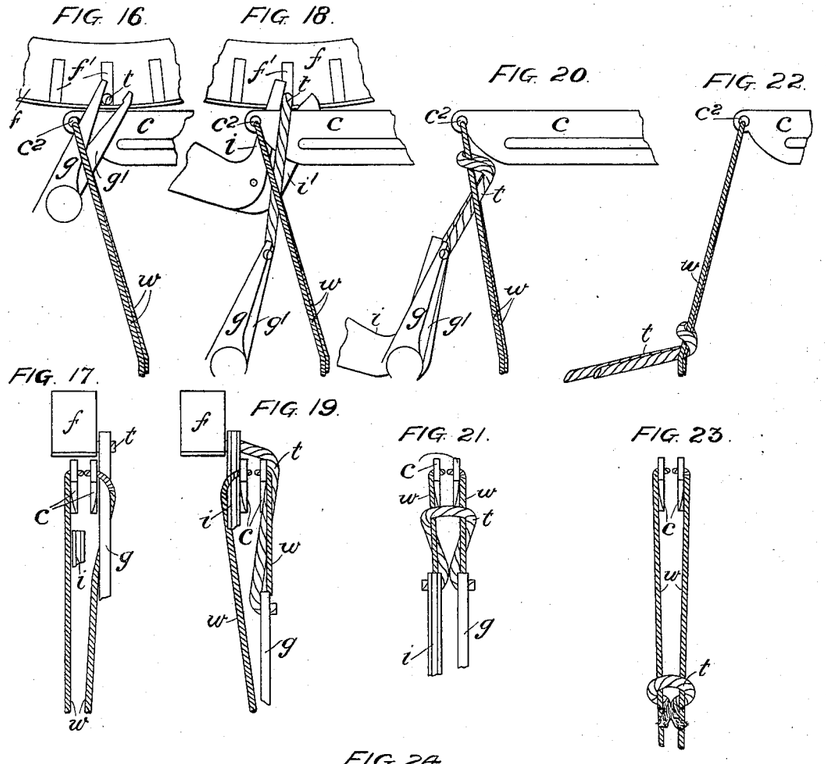
Figs. 16 and 17, 18 and 19, 20 and 21, 22 and 23 are respectively full-size side and end elevations of the warp-carriers with warps attached, showing various stages of the operations of drawing a selected tuft of yarn from the tuft-carrier, shearing it off, and tying it to the warps.

At short intervals apart across the loom a pair of warp-carriers $c$ is thus moved forward under or in proximity to a tuft-carrier, which when self-colored fabrics are formed may be a stationary eye through which the yarn from a reel or bobbin is led, but which for the purpose of producing figured fabrics having multicolored designs woven in them is carried by a tuft-selector $f$, which is operated by a jacquard either direct or through pattern mechanism, such as is represented in Fig. 7, to present over or in front of the pair of warps $w$ the end of one of the number of colored tuft-yarns $t$, led to eyes $f'$ in it from a bank of bobbins. As many tuft-selectors $f$ are provided as there are notches in the bars $e^2$ or $e^3$ on pairs of warp-carriers $c$, projected forward to have tufts knotted on the warps between each intermittent movement of the frame $b$. The yarn end so presented by each tuft-selector is caught by a gripper $g$, having plier-like jaws $g\ g'$, as many grippers $g$ being provided as there are tuft-selectors $f$, the grippers being carried on a rail or bar $h$, extending lengthwise in front of the loom and having suitable motions imparted to it to raise each gripper $g$ upward, forward, and sidewise between the warp $w$ and the face of its carrier $c$ on one side into a position in which the jaws $g\ g'$, having been previously opened to catch the tuft-yarn, are closed by a spring $g^2$ to hold it, the gripper then descending to draw from the selector $f$ the requisite length of yarn to form a tuft. Figs. 16 and 17 show the gripper $g$ entered between one warp $w$ and the outer side of the warp-carrier $c$ and about to engage the tuft-yarn $t$, projecting from an eye or orifice $f'$. At the same time each selector $f$ is moved by mechanical devices across the width of each corresponding pair of forwardly-projected warp-carriers $c$ to permit of a combined cutting and gripping shears $i$, of which there are also the same number as there are of tuft-selectors, the shears being carried on a separate longitudinal rail or bar $j$, similar to the bar $h$ and similarly actuated, so that the shears $i$ are passed up, forward, and sidewise between the warp $w$ on the farther side and the face of the adjoining carrier $c$ of the pair to cut off and hold the end of the length or tuft of yarn $t$ drawn by the gripper $g$, after which operation the tuft-selector $f$ returns to its original position.

Figs. 18 and 19 show the shears $i$ entered between the warp $w$ and the warp-carrier $c$ and about to cut through the tuft $t$, drawn off by the gripper $g$. The rails $h\ j$, with the gripper $g$ and shearing device $i$, may be so actuated that as the gripping-shears $i$ descend with one end of the tuft the gripper $g$ rises slightly until an equal length of tuft $t$ depends on each side of the pair of warp-carriers $c$, the bight of the tuft being then resting over the noses of the pair of warp-carriers or across the front of the pair of warps. The rails $h$ and $j$ then descend with the tuft-gripping devices $g\ i$, so that the bight or loop of the tuft is pulled over the rounded ends or noses of the warp-carriers $c$ beyond the eyes $c^2$, through which the warps $w$ pass, as indicated by Figs. 20 and 21, and the tuft $t$ is drawn down with the ends between the warps and the bight or loop over or round the pair of warps $w$, so that the tuft is looped, tied, or knotted on the pair of warps $w$, as indicated by Figs. 22 and 23.

Figures 10, 11:
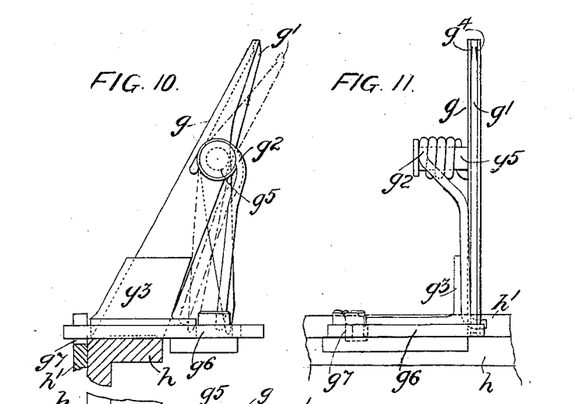
Figs. 10, 11, and 12 are respectively side and end elevations and plan of one of the grippers which engage with and draw the tuft of yarn from the tufting-segment.
Figures 12, 13, 14, 15:
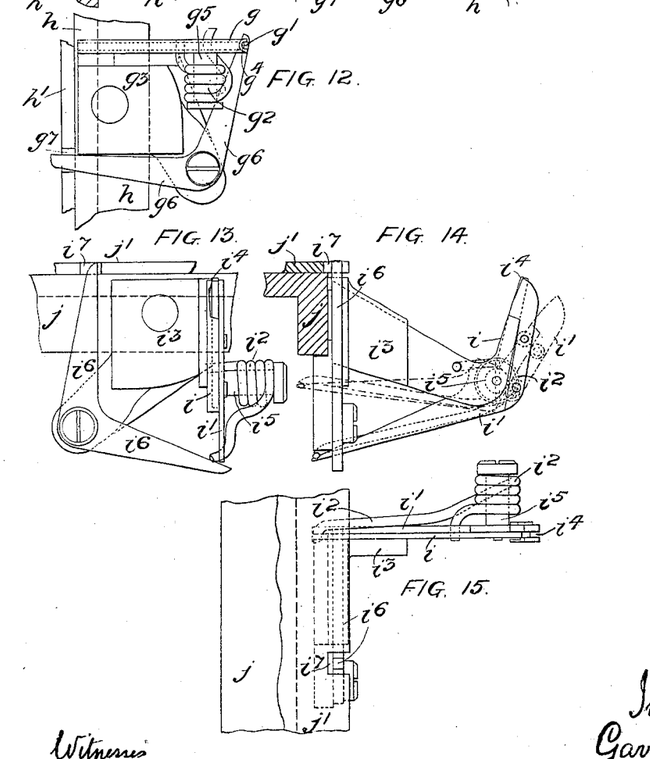
Figs. 13, 14, and 15 are like views of one of the shears or cutters which shear off the tuft drawn by the gripper and also act with the gripper to draw the cut tuft over the warp-carriers and through a pair of warps, so as to tie it thereto.

Each of the grippers $g$ is composed of a stationary jaw $g$, secured to a bracket $g^3$ on the longitudinal rail $h$, the said jaw $g$ being formed of a strip of sheet metal doubled so as to leave a channel $g^4$ extending from the bracket-base $g^3$ to the point or extremity within which channel the movable solid jaw $g'$ is pivoted, so that the jaws $g\ g'$ have a double grip of the yarn $t$. A rat-trap or other spring $g^2$, coiled around the pivot-stud $g^5$ and whose end engages the free end of the movable jaw $g'$, serves to close the gripper $g$, and it is opened against the pressure of the spring by a bell-crank $g^6$, centered on the bracket $g^3$, and one of whose arms presses on the free end of the movable jaw $g'$ when its other end is acted on by notches $g^7$ in a link or lever $h'$, connected to a cam-lever, such as hereinafter referred to. A thickened point on the movable jaw $g'$ insures that the tuft $t$ shall not be drawn out of the jaws until they are opened up to release the tuft.

Each of the cutting and gripping shears is made, fitted, and operated in like manner—that is to say, they have each a stationary blade $i$ and a movable blade $i'$, the stationary blade being secured on a bracket $i^3$ on the rail $j$ and the movable blade being closed by a spring $i^2$, coiled upon the pivot-stud $i^5$ and opened by a bell-crank $i^6$, one of whose ends is acted on by notches $i^7$ in a link or lever $j'$ alongside the bar $j$; but the cutting edges on one side of the jaws $i\ i'$ bear hard against each other or are sharpened like scissors to cut the tufting-yarn, while the gripping or holding of the tuft when cut is effected by a doubled or channel portion $i^4$ near the extremity of the jaws $i\ i'$. The jaws of the shears are bent to clear those of the gripper when moved into position to engage the tufting-yarn $t$.

A series of pairs of warp-carriers $c$ are pushed forward, as before mentioned, at intervals along the length of the loom, and for each pair so actuated a tuft-selector $f$ and a gripper $g$ and cutting and holding shears $i$ are provided, the tuft-selectors being each centered on a shaft $f^2$, and a corresponding number of grippers $g$ and shears $i$ are fitted on the rails or bars $h$ and $j$ provided to carry them.

Tufts of yarn are drawn from each of the selectors $f$, cut off, and tied to the warps $w$ of each pair of warp-carriers $c$, pushed under the selectors, and then the warp-carriers $c$ are drawn back. The frame $b$, carrying them, is moved longitudinally to bring the adjoining pairs of warp-carriers $c$ into line with the selectors $f$, when those pairs are pushed forward and tufts $t$ tied in the manner described on the warps $w$, carried by them.

Figure 3:
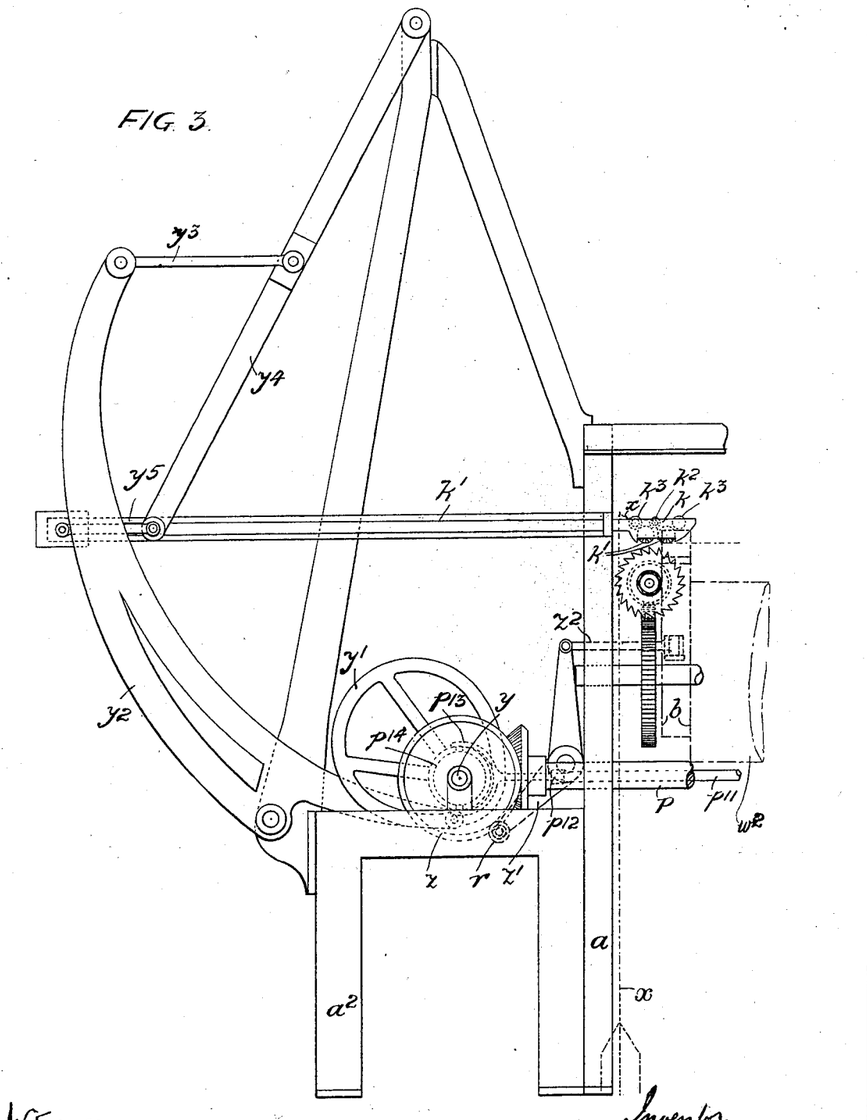
Figure 4:
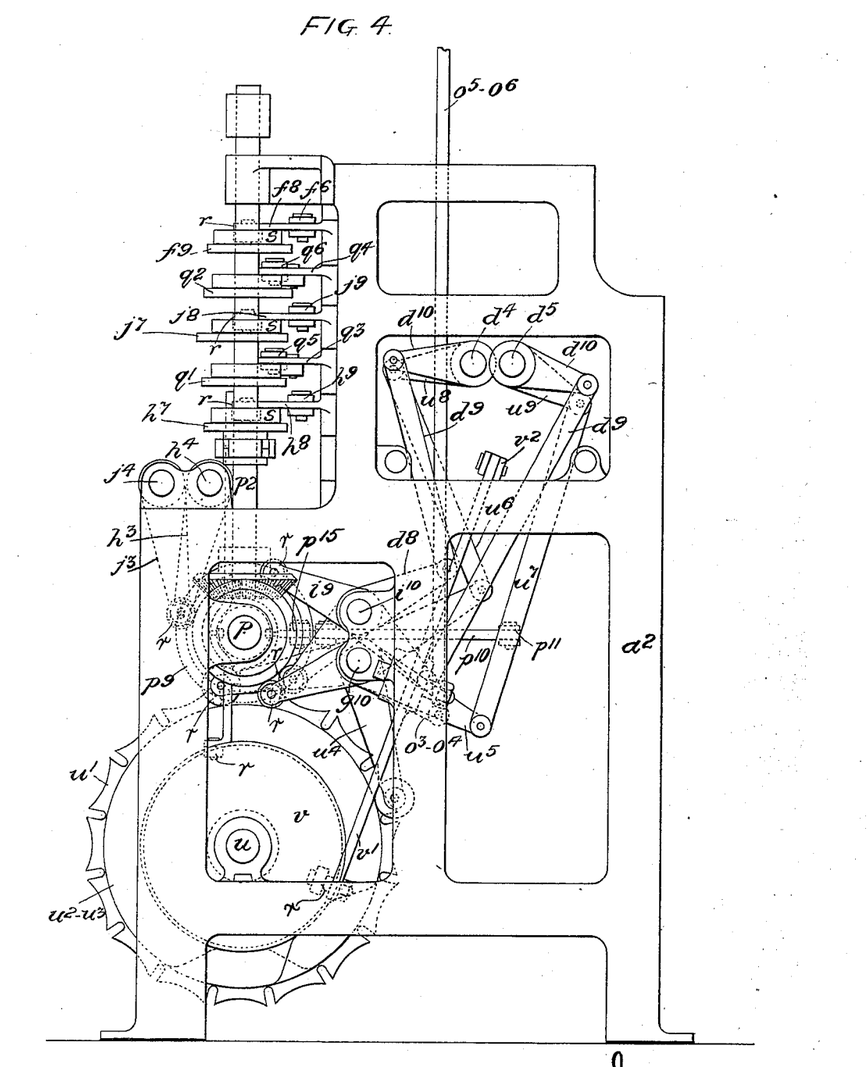
Fig. 4 is an end elevation of the end of the loom represented by Fig. 2.
Figure 5:
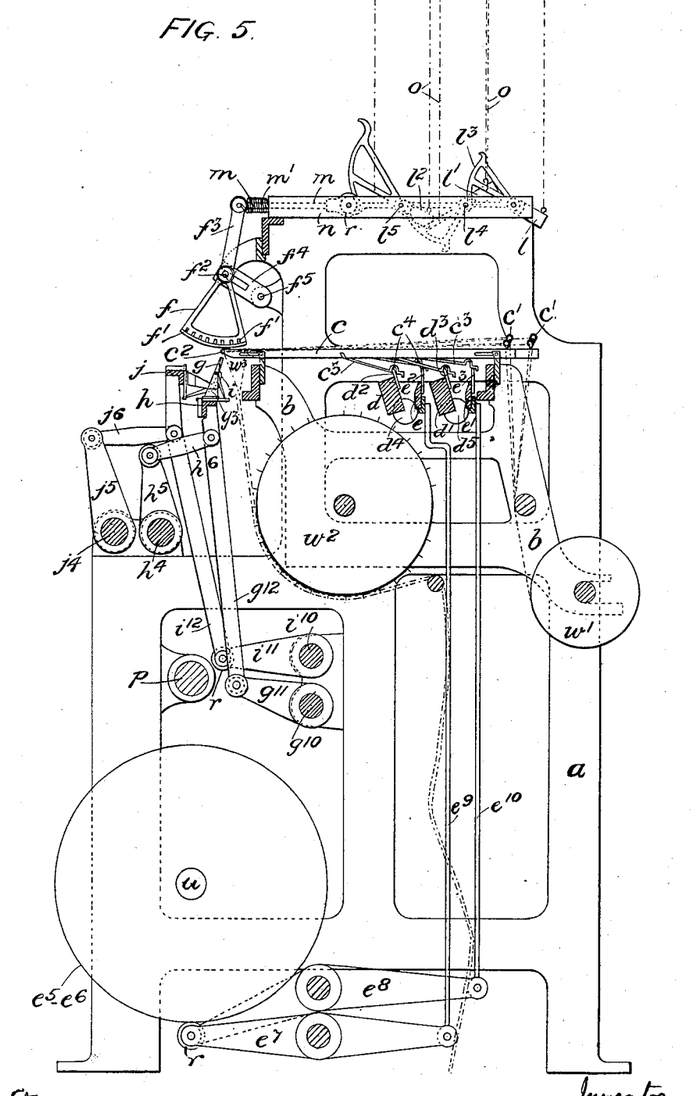
Fig. 5 is a transverse sectional elevation through the part of the loom shown at Fig. 1.
Figure 6:
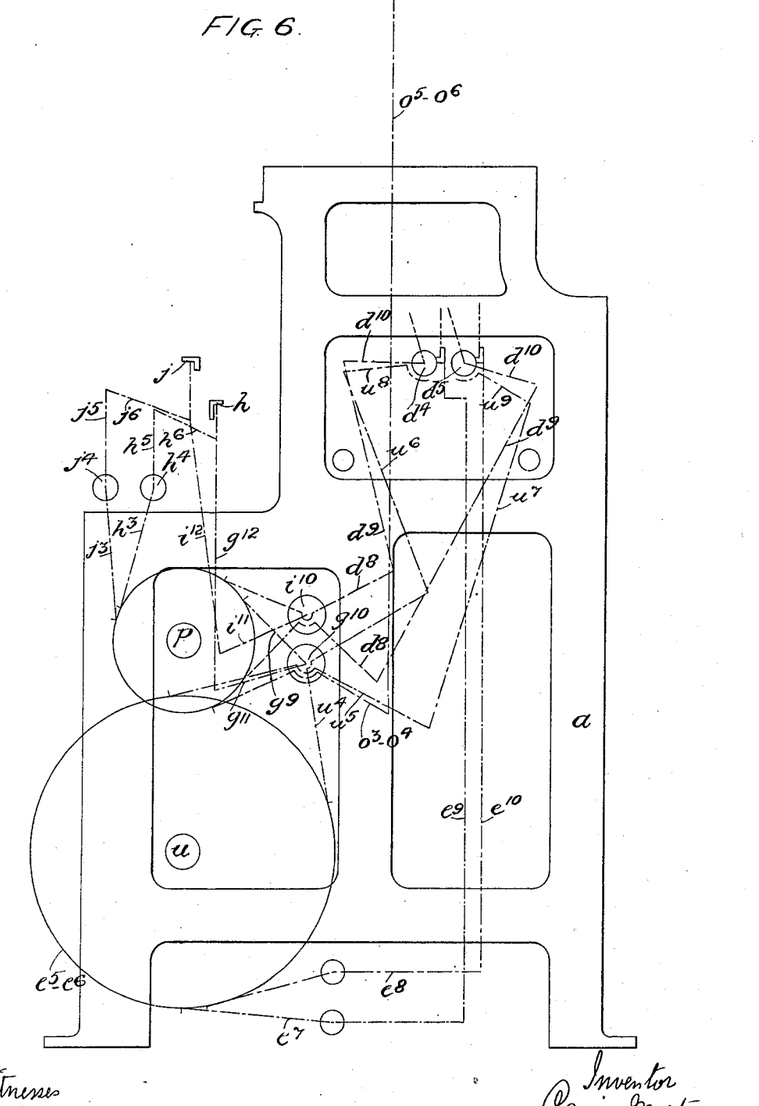
Fig. 6 is an end elevation of the loom-frame, showing in diagrammatic form by dotted lines the lever connections from the cams to the various operating parts of the loom.
Figure 24:
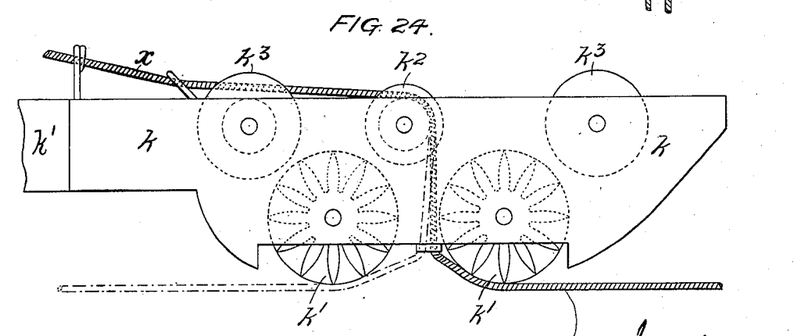
Fig. 24 is a full-size elevation of the end part of the device employed for carrying the shots of weft through the warp-shed.

The frame is intermittently moved along until tufts have been tied on all of the pairs of warps. Thus, for example, if a tuft-selector $f$ and gripping and shearing devices $g$ and $i$ are provided for every six pairs of warp-carriers $c$ the frame $b$ with these carriers $c$ will be moved six times—that is to say, five times in one direction to bring each of the successive pairs of warp-carriers into line with the selectors and once in the opposite direction to bring back the warp-carriers to the original position. On the completion of the movements for tying the tufts to the warps the warp-carriers are moved endwise, the evens in one direction and the odds in the opposite direction forward or rearward by the rocking bars $d\ d'$, acting on the spring-wires $c^3$, as hereinbefore described, whereby the warps are caused to form the shed between the eyes $c^2$ at the forward ends or noses of the carriers $c$ and the fell or cloth beam $w^2$. A weft-thread $x$ is then carried through the shed along the length of the loom by means of a weft-carrier $k$, Fig. 24, on a bar $k'$, which normally rests at the end of the loom, Fig. 3. This weft may be conveniently carried through in the form of a loop or doubled thread $x$, and at the selvage of the fabric it is engaged by a shuttle or like device carrying a tying-thread, which is passed through the weft-loop, or, as is preferred, by a knitting-machine latch-needle $x^5$, which carries one weft-thread through the loop of the adjoining weft and knits them together to form a selvage. After the weft-carrier $k$ has returned to its original position the warp-carriers $c$ may be further acted on to change the relative positions of the "odds" and "evens," so that a fresh shed is formed, and a second weft shot may then be thrown or interwoven with the warp. The weft-carrier is provided with small fluted pulleys or whirls $k'$, which serve in passing through the shed to beat up the tufts and the weft to the fell, the fluting of the pulleys $k'$ having the effect of forcing the weft between the warps, so that it assumes its final sinuous path and does not tend to draw up or narrow the width of the fabric. The weft-thread $x$ is guided through eyes and over guide-pulleys $k^2$ on the weft-carrier $k$, as indicated at Fig. 24. Pulleys $k^3$ are also provided and arranged to bear against the under side of the warp-carriers $c$, so that the weft-carrier and the fluted whirls $k'$ on it are pressed downward to the fell and effectually beat up the weft. The operations of drawing, cutting, and tying the tufts to the warps are then recommenced, and on completion over all the warps the warp-shedding and weft-throwing operations are again effected, these operations alternating with the tufting or tying operations, as in making tufted fabrics by hand.

If the fabric is self-colored, a single thread of tufting-yarn may be carried by each selector $f$; but if, as is usual, a pattern or design in several colors is to be produced as many threads as there are colors in the design are carried by the selectors, and the latter are operated to bring the yarn of the requisite color into position for being gripped and cut off at each operation of drawing off and tying a tuft. The selectors $f$ are made by preference each in the form of a segment from the pivot-axis $f^2$, of which the tufting-yarns are led to the delivery-orifices $f'$ in the periphery of the segmental arc, the orifices being each fitted with a spring which allows of the yarn $t$ being drawn out under suitable tension, but prevents it being drawn back, so that a proper length is left to project after the cutting operation for the jaws of the gripper $g$ to engage with. The segment has an arm $f^3$ on it, which is connected to jacquard or other pattern mechanism, arranged to operate the segment, so as to bring the delivery-orifice $f'$, carrying any particular color of tufting-yarn, into position for engagement by the gripping and cutting-off devices $g$ and $i$.

To minimize the number and simplify the cutting of the cards required in the jacquard apparatus, the latter, instead of acting directly on the segments of the several selectors $f$, is preferably arranged to act through intermediate mechanism, which also insures that the desired orifice of each segment will be brought positively and exactly into operative position. The intermediate mechanism which is provided to operate each tuft-selector may be similar to that employed for operating the shuttle-boxes of looms from the pattern-barrel; but by preference it is composed of one, two, or more beam-levers $l\ l'\ l^2$, having segmental eccentric or cam surfaces at one end, as indicated at Fig. 7, each acting against the power of a spring $m$ upon a rod $m'$ or other connection to the arm $f^3$ on the selector-segment. If only two movements of the selector are required, a single beam-lever $l$ will suffice. If four movements are required, two beam-levers are used, and if eight movements of the selector are wanted to present to the gripper $g$ any one of eight separate colored yarns $t$ then three beam-levers $l\ l'\ l^2$ are employed, as shown. The eccentric or cam surface $l^3$ of the first beam-lever $l$ is arranged to bear on the center pivot $l^4$ of the second lever $l'$, and in like manner the cam-surface of the second lever $l'$ acts on the pivot center $l^5$ of the third lever $l^2$, the pivots being fitted in grooved or slotted guide bars or frames $n$, along which they are free to slide. In one position of the levers $l\ l'\ l^2$ the selector is in the position to present the first tuft-orifice $f'$ to the gripper $g$. When the lever $l$ is tilted on its center by the action of the jacquard, the eccentric or cam surface $l^3$ on it presses the pivot $l^4$ of the adjoining lever $l'$ along the guides and through the rod $m'$ or other connection to actuate the selector $f$, so that the second orifice $f'$ is presented to the gripper. By returning the first lever-arm to its original position and drawing or tilting up the second lever $l'$, as shown by Fig. 7, the third orifice $f'$ of the selector $f$ is brought into position opposite the gripper, and so on, each change of the lever-arms being arranged to effect a corresponding change of the selector. The levers $l\ l'\ l^2$ are acted on each by two cords $o$ from the jacquard, these cords being connected on opposite sides of the lever centers.

Figure 1:
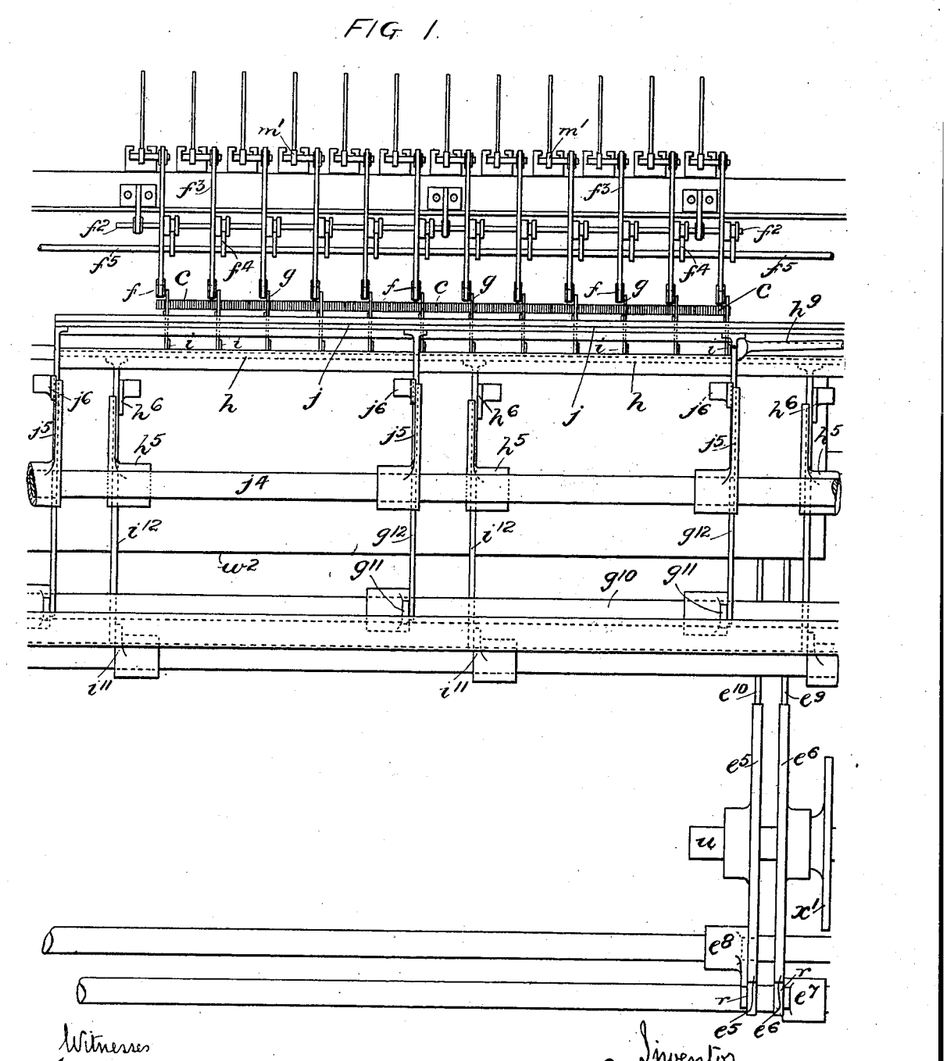
Figures 1, 2, and 3 are front elevations, respectively, of the mid-portion, the right-hand portion, and the left-hand portion of the machine, these three views taken together representing a complete loom or machine of narrow width of which the central part is the loom proper and comprises the knotting or weaving mechanism, while the part shown in Fig. 2 illustrates the cams, rods, and levers which transmit the requisite movements to the weaving mechanism, and the part shown at Fig. 3 illustrates the devices for throwing the shots of weft through the shed of the fabric being woven.
Figure 2:
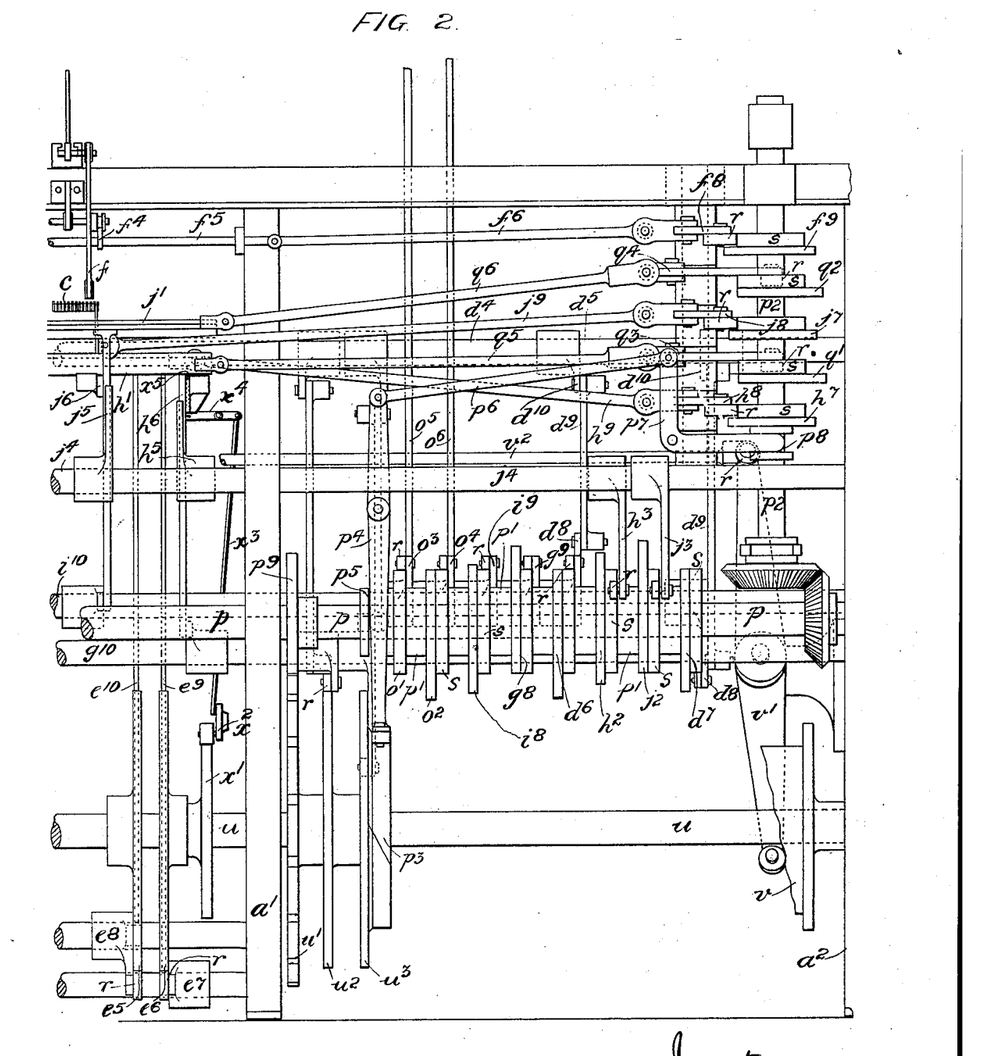

The movements of the various parts of the loom are effected by a series of cams carried on several rotating shafts in bearings on the frame or end standards $a\ a'$. The main rotating shaft or first-motion shaft $p$ carries a sleeve $p'$, adapted to turn with it and also to slide on it endwise at certain times. A vertical shaft $p^2$, geared to the horizontal shaft $p$, (shown at Fig. 2,) slides also endwise with the sleeve $p'$. The sleeve $p'$ derives its endwise motion from a cam $p^3$ through a lever $p^4$, acting on a grooved disk $p^5$ on the sleeve, the vertical shaft $p^2$ receiving its endwise motion from the lever $p^4$, connecting-rod $p^6$, bell-crank lever $p^7$, and grooved disk $p^8$ on the vertical shaft $p^2$. On the sleeve $p'$ and on the vertical shaft $p^2$ are what may be termed the "tufting-cams"—i. e., the cams $d^6\ d^7$—acting on levers $d^8\ d^8$ through links $d^9\ d^9$, levers $d^{10}\ d^{10}$ onto shafts $d^4\ d^5$, which again act through the rock-bars $d$ and $d'$ to push forward and rearward (through the blades $d^2\ d^3$ and springs $c^3$) the warp-carriers $c$, so as to present them in pairs to the grippers $g$ and shears $i$.

The cam $g^8$ acts through a lever $g^9$, pivot-bar $g^{10}$, levers $g^{11}$, and links $g^{12}$ on the bar $h$, on which are fixed the grippers $g$, giving them their vertical movement. The cam $h^2$ acts through a lever $h^3$ on pivot-shaft $h^4$, which again acts through a lever $h^5$ and link $h^6$ on the bar $h$ to give the bar its horizontal movement. The bar $h$ is controlled sidewise by a cam $h^7$ on the vertical shaft $p^2$ through a lever $h^8$ and link $h^9$.

The cam $i^8$ acts through a lever $i^9$, a pivot-bar $i^{10}$, levers $i^{11}$, and links $i^{12}$ on the bar $j$, on which is fixed the shears, so giving them their vertical movement. The cam $j^2$ and lever $j^3$, acting on the pivot-shaft $j^4$, levers $j^5$, links $j^6$, impart the horizontal movement to the bar $j$. The cam $j^7$ on the vertical shaft $p^2$ and the lever $j^8$ through the link $j^9$ impart the side movement to the bar $j$, on which are the shears. The cams $q'\ q^2$, acting on the levers $q^3$ and $q^4$ through the links $q^5$ and $q^6$ on the notched bars $j'$ and $h'$, give the opening action to the shears $i$ and the grippers $g$.

The jacquard which operates the weft-selectors derives its action from the cams $o'\ o^2$ through the levers $o^3\ o^4$ and the links $o^5\ o^6$. A cam $f^9$ on the shaft $p^2$, acting on levers $f^8$ and links $f^6$, shaft $f^5$, and fork $f^4$, effects the side movement of the selectors, which is required to enable the shears to engage the tuft-yarns which have been drawn off by the grippers. A stepped end cam $v$ is fitted on the second or intermittently-rotating shaft $u$ to impart through a lever $v'$ and links $v^2$ the intermittent and progressive movement of the frame $b$, on which are fitted the warp-carriers $c$, so that a fresh pair of warp-carriers are operated to bring the warps on them into position for the tufting operation after each weft shot.

From the main shaft $p$, carrying the sleeve $p'$, the second-motion shaft $u$ receives slower and intermittent movement through a star-wheel $u'$ on the shaft $u$ and a pin or like means on a disk $p^9$ on the shaft $p$. On this second shaft $u$ are fitted cams $u^2$ and $u^3$ to operate through suitable levers, such as $u^4\ u^5$, links $u^6\ u^7$, and levers $u^8\ u^9$, the rock-shafts $d^4\ d^5$, carrying the bars $d\ d'$ and plates $d^2\ d^3$, by means of which are effected the movements of the warp-carriers $c$ to open the shed $w^3$.

The cams $e^5$ and $e^6$, operating through levers $e^7\ e^8$ and the links $e^9\ e^{10}$, serve to raise and lower the movable bars $e\ e'$, which actuate the springs $c^3$, raising them so that only the springs which are opposite to or fall into the notches $e^4$ can be operated on by the bars $d^2$ and $d^3$. As the tufting-cams on the sleeve $p'$ and shaft $p^2$ are thrown out of action the cams on a third-motion shaft $y$ are brought into operation, which movement is effected from the cam $p^3$, lever $p^4$, link $p^{15}$, lever $p^{10}$, link $p^{11}$, and elbow-lever $p^{12}$, on the end of which there is a fork $p^{13}$, acting on a grooved disk $p^{14}$ on the shaft $y$, and the cams on this shaft effect the throwing of the tuft shot. A cam $y'$ on the third shaft $y$ operates the weft-carrier $k$ and throws it through the open shed $w^3$ by means of a lever $y^2$, link $y^3$, lever $y^4$, and link $y^5$.

The selvage-shuttle or knitting-needle $x^5$, which passes through the weft-loops, is operated from a cam $x'$ on the intermittent or second shaft $u$, acting through the lever $x^2$ and link $x^3$ and the lever $x^4$. The return movement of the frame $b$ is effected by a cam $z$ through bell-crank levers $z'$ and link $z^2$ on the left-hand side of the machine, Fig. 3, which is brought into operation by the endwise movement of the shaft $y$. The endwise movements of the sleeve $p'$ and shaft $p^2$ serve to throw the tufting-cams out and into operation, and antifriction-rollers $r$ on the levers run upon concentric disks $s$, formed on the sides of the cams when the sleeve $p'$ and shaft $p^2$ have been moved endwise to throw the tufting-cams out of action.

The sleeve $p'$ with its cams, the cams on the vertical shaft $p^2$, and the second and third motion shaft $u$ and $y$ are preferably fitted on extensions of the shafts between the end standards $a$ and $a'$ and other outside standards $a^2$ or bearing-supports, so that they and their connecting-levers may be clear of the other working parts of the loom and more readily accessible.

In looms of large size for weaving fabrics of great breadth it may be advisable to duplicate or multiply the parts which operate the tufting and shedding devices to avoid the strain of transmitting the motions over the whole length of the loom.

Having now described the invention, what

I claim, and desire to secure by Letters Patent, is—

1. In an apparatus for the manufacture of tufted fabrics and in combination, an intermittently-moving frame, a plurality of sliding bars fitted thereon, adapted to serve as warp-carriers, a plurality of tuft-yarn holders arranged in proximity to the forward ends or eyes of said warp-carriers, means for bringing successive pairs of the warp-carriers under the tuft-holders, gripping and shearing devices actuated in unison for gripping and shearing off tuft lengths of yarn, and for drawing them in loop form over and through between adjacent pairs of warps to knot or tie them on these warps, means for moving the alternate warp-carriers in opposite directions to form a warp-shed, and means for carrying a shot or shots of weft-thread through the warp-shed to bind the knotted tufts, and to form with the warps the backing or groundwork of the fabric.

2. In an apparatus for the manufacture of tufted fabrics and in combination, suitable end standards, an intermittently-moving frame, a plurality of sliding bars fitted thereon and adapted to serve as warp-carriers, a plurality of tuft-yarn selectors, and mechanism operated from a jacquard to present any one of a series of colored tuft-yarn ends carried by the selectors in proximity to the forward ends or eyes of said warp-carriers, means for bringing successive pairs of the warp-carriers under the tuft-holders, gripping and shearing devices actuated in unison to enter between the warps and the adjacent warp-carriers, and to grip and shear off tuft lengths of yarn, and draw them in loop form over and through between adjacent pairs of warps to knot or tie them on these warps, means for moving the alternate warp-carriers in opposite directions to form a warp-shed, and means for carrying a shot or shots of weft-thread through the warp-shed to bind the knotted tufts and to interweave with the warps the backing or groundwork of the fabric.

3. In a machine for weaving or producing tufted fabrics the combination with a suitably-supported frame having cross-grooves and sliding bars fitted and furnished with eyes to serve as warp-carriers, of means for imparting intermittent endwise movement to the frame, tuft-yarn holders, means for successively sliding each pair of a group of the warp-carriers forward into proximity with said tuft-yarn holders to present the warps to tuft-forming devices, and means for sliding the alternate warp-carriers in opposite directions to shed the warp after a row of tufts have been tied to the warps so that a binding shot or shots of weft may be inserted between the warps.

4. In a machine for weaving or producing tufted fabrics the combination of a suitably-supported frame having intermittent endwise movement, and a plurality of warp-carrying bars fitted to slide in grooves transversely thereof, means for imparting the intermittent movement to the frame, means for sliding forward the warp-carriers in successive pairs, and means for sliding the alternate warp-carriers to right and left as and for the purpose set forth.

5. In a machine for weaving or producing tufted fabrics the combination of a suitably-supported frame, means for imparting intermittent endwise movement thereto, a plurality of warp-carrying bars fitted to slide in grooves transversely of the frame, rocking bars located under the warp-carriers and means for operating them, notched spring-wires attached to the warp-carriers engaging the rocking bars whereby they are operated to shed the warp, and vertically-moving bars notched at intervals to raise the spring-wires out of engagement with the rocking bars while allowing pairs at intervals to engage these bars whereby the warp-carriers are projected forward in pairs at intervals as and for the purpose set forth.

6. In a machine for weaving or producing tufted fabrics the combination with a movable frame having grooves and a plurality of warp-carrying bars adapted to slide in said grooves in said movable frame, of a tuft-yarn holder located in proximity to the ends of a forwardly-projected pair of such bars, and carrying the end of a tufted yarn-thread, a tuft-gripping device mechanically operated to enter between one of the warp-carriers and a warp-thread carried thereby, and to engage the end of the tuft-yarn, a tuft shearing and gripping device similarly operated to enter between the adjacent warp-carrier and a warp-thread carried thereby on the opposite side, and to shear off a tuft length from the tuft-yarn, and in conjunction with the other gripping device to draw the bight or loop of the tuft over or round the pair of warps and the free ends of the tuft between the pair of warps so as to knot or tie the tuft to the warps as described.

7. In a machine for producing tufted fabrics the combination of devices for inserting and knotting or tying a tuft of yarn to a pair of warp-threads, comprising a pair of warp-carrying bars, a tuft-yarn holder located in proximity to the ends thereof, and carrying tuft-yarn thread, a jawed gripper opening and closing to engage the tuft-yarn end, and a combined shears and gripper similarly acting to cut off a tuft length and engage its end, and means for operating the gripper and shears so that they draw the bight or loop of the tuft over the pair of warps with the free ends between the warps so as to tie the tuft thereto.

8. In a machine for producing tufted figured fabrics, the combination with a tuft-yarn holder having a plurality of yarn-delivery eyes, of pattern mechanism connected thereto and composed of a plurality of beam-levers, connected to a jacquard, each having cam-surfaces at one end bearing upon the pivot center of the adjacent lever, the said pivot centers being fitted in grooved or slotted guides along which they are free to slide, and a spring or counterweight for drawing them toward one end of the guide.

9. In a machine for producing tufted fabrics, the combination with a bar carrying a plurality of jawed tuft-yarn grippers, each composed of a fixed jaw secured to the bar and a movable jaw closed by a spring, and a notched bar arranged to act on the movable jaw to open it, and means for imparting relative movement to the gripper-carrying bar and the notched bar for effecting the opening of the jaws of the series of grippers.

10. In a machine for producing tufted fabrics, a tuft-yarn gripper for drawing off the tufting-yarn and knotting it to the warps, composed of a fixed jaw having a longitudinal channel and a movable solid jaw pivoted thereto so as to rest in said channel, and a spring arranged to close the movable jaw as described.

11. In a machine for producing tufted fabrics a tuft-yarn shearing and gripping device for cutting off a length of tuft-yarn presented to it, gripping it and knotting it to the warps, the said device being composed of a single fixed jaw and a movable twin jaw pivoted thereto and forming with the fixed jaw means for shearing the yarn and for gripping the end of the cut length, and a spring arranged to close the movable jaw as described.

12. In a machine for producing tufted fabrics, the combination with a traversing bar and warp-carrying bars of a weft-carrier fixed to the end of said traversing bar, and means for operating it to traverse the open shed of warp-threads, the said carrier being provided with pulleys arranged to bear against the under side of the warp-carriers and whirls under which the weft is led and by means of which it is pressed down between the shed-warps as described.

In witness whereof I have hereunto set my hand in presence of two witnesses.

GAVIN MORTON.

Witnesses:
    JNO. ARMSTRONG, Jr.,
    JAMES WRIGHT.